United States Patent
Sin

(10) Patent No.: US 10,158,505 B2
(45) Date of Patent: Dec. 18, 2018

(54) ANALOG INPUT AND OUTPUT MODULE

(71) Applicant: LSIS CO., LTD., Anyang-si, Gyeonggi-do (KR)

(72) Inventor: Yonggak Sin, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 528 days.

(21) Appl. No.: 13/745,398

(22) Filed: Jan. 18, 2013

(65) Prior Publication Data
US 2013/0188752 A1    Jul. 25, 2013

(30) Foreign Application Priority Data
Jan. 20, 2012    (KR) .................. 10-2012-0006892

(51) Int. Cl.
*H04L 27/00* (2006.01)
*G05B 19/05* (2006.01)

(52) U.S. Cl.
CPC ........ *H04L 27/0002* (2013.01); *G05B 19/054* (2013.01)

(58) Field of Classification Search
CPC ....... G06F 13/00; G06F 13/14; G05B 19/054; H04L 27/0002
USPC .......................................................... 710/69
See application file for complete search history.

(56) References Cited

U.S. PATENT DOCUMENTS

| | | | |
|---|---|---|---|
| 6,449,715 B1 | 9/2002 | Krivoshein | |
| 2004/0148135 A1* | 7/2004 | Balakrishnan | G05B 19/4185 702/188 |
| 2007/0234373 A1* | 10/2007 | Ozaki | G06F 9/45537 719/324 |
| 2007/0280286 A1* | 12/2007 | Hodson | H04L 67/12 370/466 |
| 2008/0162738 A1 | 7/2008 | Apel et al. | |
| 2008/0274766 A1* | 11/2008 | Pratt | G01D 21/00 455/552.1 |
| 2009/0010203 A1* | 1/2009 | Pratt, Jr. | H04L 12/66 370/328 |

(Continued)

FOREIGN PATENT DOCUMENTS

| | | |
|---|---|---|
| CN | 201514284 | 6/2010 |
| CN | 101893868 | 11/2010 |

(Continued)

OTHER PUBLICATIONS

European Patent Office Application Serial No. 13150907.7, Search Report dated Apr. 26, 2013, 6 pages.

(Continued)

*Primary Examiner* — Idriss N Alrobaye
*Assistant Examiner* — Brooke J Taylor
(74) *Attorney, Agent, or Firm* — K&L Gates LLP

(57) ABSTRACT

Provided is an analog input and output module, the module comprising a first signal processing unit configured to separate analog signal inputted from a plurality of HART transmitters from first HART data, convert the analog signal to digital data, transmit the first HART data to a second signal processing unit, and transmit second HART data received from the second signal processing unit to at least one of the plurality of HART transmitters; and the second signal processing unit configured to control the first signal processing unit and storing conversion result.

4 Claims, 3 Drawing Sheets

(56) References Cited

U.S. PATENT DOCUMENTS

| | | | | |
|---|---|---|---|---|
| 2009/0010233 | A1* | 1/2009 | Pratt, Jr. | G01D 21/00 |
| | | | | 370/338 |
| 2010/0214091 | A1* | 8/2010 | Thoren | H04L 12/40039 |
| | | | | 340/539.1 |
| 2011/0113788 | A1* | 5/2011 | Johnson | G05B 19/058 |
| | | | | 60/793 |
| 2011/0172790 | A1 | 7/2011 | Alley et al. | |
| 2012/0002734 | A1* | 1/2012 | Komiyama | G05B 19/0423 |
| | | | | 375/259 |
| 2012/0004741 | A1* | 1/2012 | Suzuki | G05B 19/042 |
| | | | | 700/12 |
| 2012/0179423 | A1* | 7/2012 | Robl | 702/188 |
| 2013/0060351 | A1* | 3/2013 | Imming | H04W 4/029 |
| | | | | 700/13 |

FOREIGN PATENT DOCUMENTS

| | | |
|---|---|---|
| JP | 7-57000 | 3/1995 |
| JP | 2003-186503 | 7/2003 |
| JP | 2008-108017 | 5/2008 |
| JP | 2012-014387 | 1/2012 |
| KR | 10-2012-0002412 | 1/2012 |

OTHER PUBLICATIONS

Korean Intellectual Property Office Application Serial No. 10-2012-0006892, Office Action dated Feb. 28, 2013, 3 pages.
Japan Patent Office Application Serial No. 2013-007696, Office Action dated Dec. 17, 2013, 4 pages.
The State Intellectual Property Office of the People's Republic of China Application Serial No. 201310019940.0, Office Action dated Jan. 19, 2015, 8 pages.

* cited by examiner

ANALOG INPUT AND OUTPUT MODULE

CROSS-REFERENCE TO RELATED APPLICATIONS

Pursuant to 35 U.S.C. § 119 (a), this application claims the benefit of earlier filing date and right of priority to Korean Patent Application No. 10-2012-0006892, filed on Jan. 20, 2012, the contents of which are hereby incorporated by reference herein in their entirety.

BACKGROUND OF THE DISCLOSURE

Field of Endeavor

The present disclosure relates to an analog input and output module, and more particularly to an analog input and output module applied to a PLC (Programmable Logic Controller).

Background

Generally, an analog input and output module (hereinafter referred to as "analog I/O module") of a PLC system is a module that receives an analog electrical signal outputted from a transmitter, performs an analog/digital conversion and outputs in digital data.

Meanwhile, concomitant with a recent increase in requirement on high functional and intelligent transmitter and its effective management, a communication function between transmitter used in a DCS (Distributed control system) and a PLC is demanded.

A current communication protocol mostly used in a transmitter is HART (Highway Addressable Remote Transducer) communications Protocol. The HART communications protocol is a backward-compatible enhancement to 4-20 mA instrumentation that allows two-way communications with smart, microprocessor-based field devices. The most notable advantage of the HART protocol is that it can communicate over legacy 4-20 mA analog instrumentation wiring and sharing a pair of wires used by the older system. The HART Protocol may be one of the most popular industrial protocols today.

The HART protocol is also advantageous in that a measurement value measured in added information along with analog signal is digitally outputted, various parameters can be set up and calibration on a transmitter can be remotely performed. In addition, a real-time daily instrument troubleshooting is possible to enable a 3-D monitoring on an on-site status. Due to the advantages of the HART protocol, many transmitters are included with HART communication functions, and the DCS connected to the transmitter uses products supporting the HART communications.

Meanwhile, the rapidly developing PLC performances have recently expanded to the DCS areas, and as a result, the HART communication functions largely used by the DCS are now also required by the PLC.

FIG. 1 is a schematic configuration illustrating a PLC system using a HART transmitter according to prior art.

Referring to FIG. 1, the conventional PLC system includes a PLC (200), and a transmitter interface (300) interfacing a HART transmitter (400) with the PLC (200).

The transmitter interface (300) comprises a terminal block module (320) receiving analog signal and HART data from the HART transmitter (400) and transmitting the analog signal to an analog I/O module (230) of PLC, and a communication module (310) separating the HART data superimposed with the analog signal inputted from the terminal block module (320), analyzing and transmitting the HART data to a communication module (220) of PLC.

The PLC (200) comprises a communication module (220) communicating with the communication module (310) of the transmitter interface (300), an analog input module (230) converting the analog signal received from the terminal block module (320) to digital data, and a PLC CPU (Central Processing Unit, 210) connected to a user terminal (100) to perform tasks related to program and monitoring.

That is, as illustrated in FIG. 1, the transmitter interface (300) and the communication module (220) are essentially required to use the analog signal outputted from the HART transmitter (400) and the HART data. The transmitter interface (300) transmits the analog signal to the analog input module (230), and transmits the HART data to the PLC communication module (220). The communication module (310) inside the transmitter interface (300) must separate the HART data superimposed on the analog signal, and convert it to a communication protocol to be transmitted.

At this time, types of communication module (220) of the PLC (200) are determined by protocol method of the communication module (310) of the transmitter interface (300), which means that two products must be used for HART communication, resulting in an increase in cost.

SUMMARY

The present disclosure has been made to solve the foregoing disadvantages/problems of the prior art and therefore an object of certain embodiments of the present invention is to provide an analog I/O (Input and Output) module configured to perform HART data processing at a PLC (Programmable Logic Controller), whereby an installation cost can be reduced and a simple system can be realized.

In one general aspect of the present disclosure, there is provided an analog I/O module, the module comprising: a first signal processing unit configured to: separate analog signal inputted from a plurality of HART transmitters from first HART data, convert the analog signal to digital data, transmit the first HART data to a second signal processing unit, and transmit second HART data received from the second signal processing unit to at least one of the plurality of HART transmitters; and the second signal processing unit configured to control the first signal processing unit and storing conversion result.

Preferably, but not necessarily, the first signal processing unit may comprise an I/O (Input/output) unit configured to receive the analog signal and the first HART data inputted from the plurality of HART transmitters; a conversion unit configured to convert the analog signal to digital data; a communication unit configured to transmit the first HART data to the second signal processing unit and transmit the second HART data received from the second signal processing unit to the I/O unit; and an insulation unit configured to insulate data outputted from the conversion unit and the communication unit.

Preferably, but not necessarily, the first signal processing unit may further comprise a filter unit configured to separate the analog signal from the first HART data.

Preferably, but not necessarily, the I/O unit may form channels with the plurality of HART transmitters, and include a plurality of terminals receiving a signal from the channels corresponding to the plurality of HART transmitters.

Preferably, but not necessarily, the I/O unit may multiplex the analog signal received from the plurality of terminals and provide the multiplexed analog signal to the converting unit.

Preferably, but not necessarily, the first signal processing unit may further comprise a switching unit configured to switch and output the second HART data received from the communication unit to any one of the plurality of terminals of the I/O unit.

Preferably, but not necessarily, the second signal processing unit may comprise an interface unit configured to store the digital data converted by the converting unit and transmit the digital data to a high-level PLC system; and a controller configured to interpret the first HART data received from the communication unit and provide the second HART data to the communication unit.

Preferably, but not necessarily, the controller may control the switching unit by determining a terminal of the I/O unit to be transmitted with the second HAR data.

The analog I/O (Input and Output) module according to the present disclosure has an advantageous effect in that a HART interface-capable analog input module can be provided to a PLC to allow the PLC to perform a HART communication with a HART transmitter free from a transmitter interface, whereby a user desired to configure a HART communication can be directly saved with costs.

BRIEF DESCRIPTION OF THE DRAWINGS

The drawing figures depict one or more exemplary embodiments in accordance with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Figure 1:
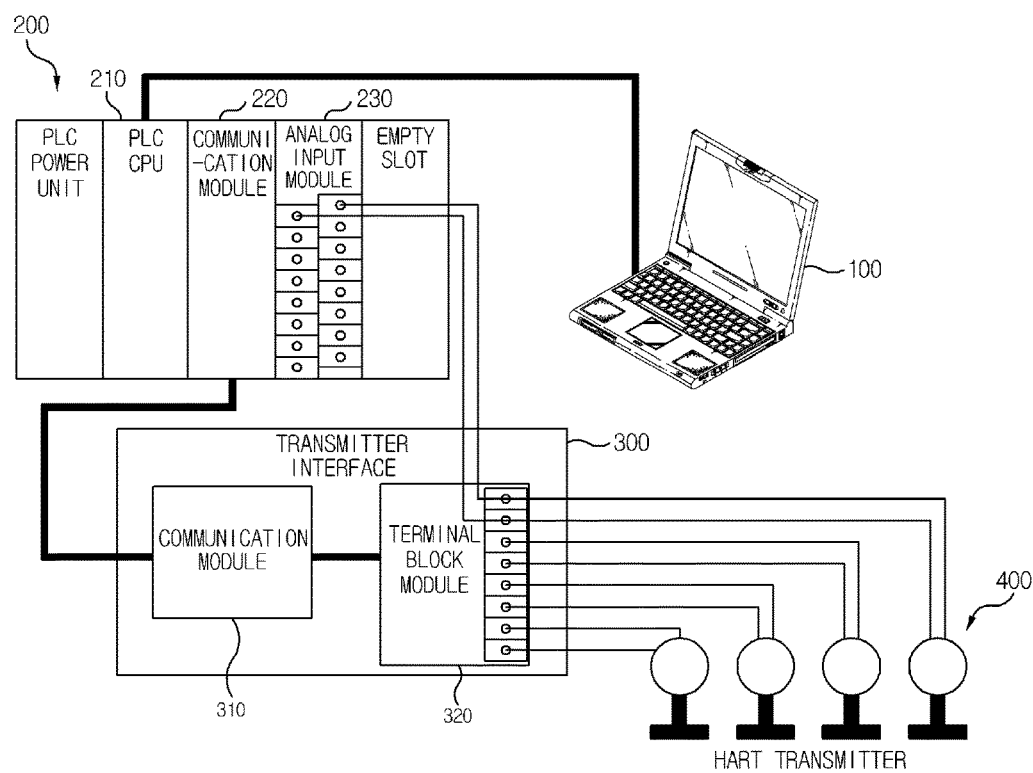
FIG. 1 is a schematic configurative view illustrating a PLC system using a HART transmitter according to prior art.
Figure 2:
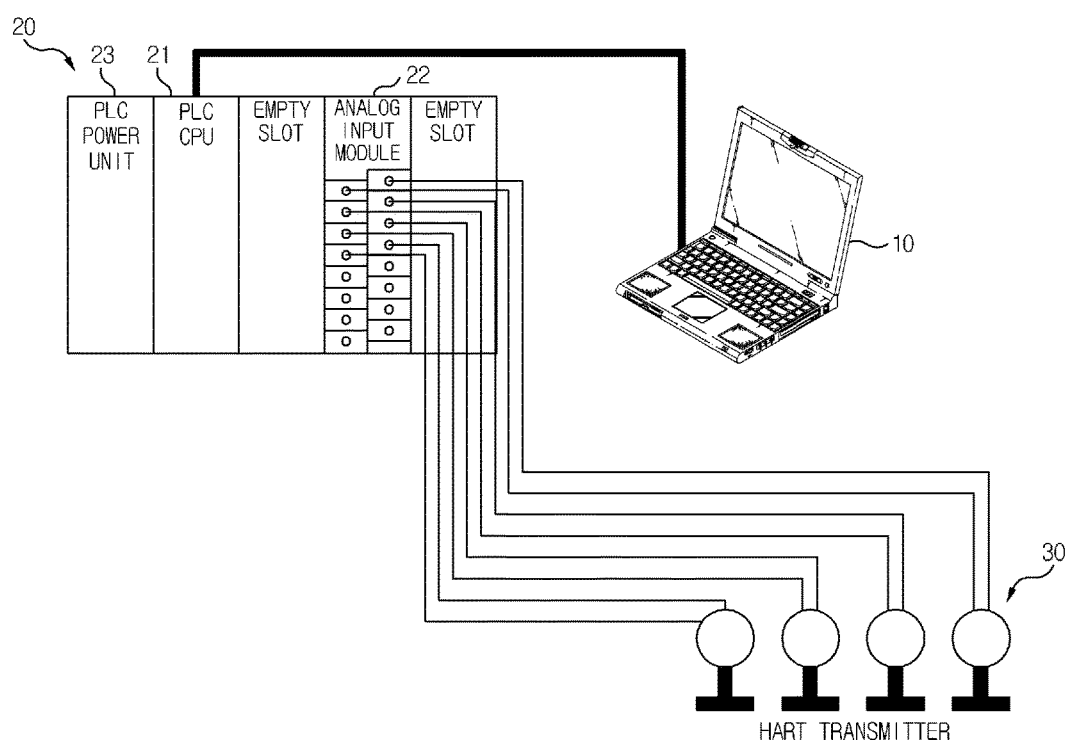
FIG. 2 is a schematic configurative view illustrating a PLC system according to an exemplary embodiment of the present disclosure.
Figure 3:
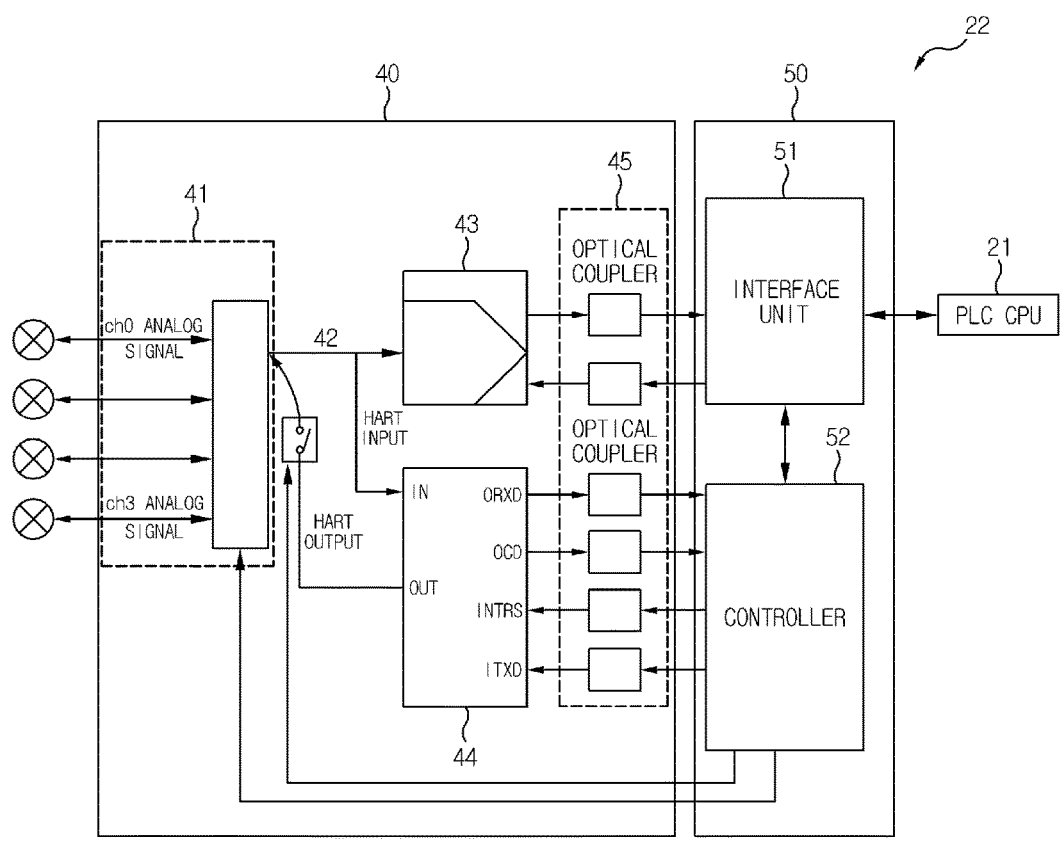
FIG. 3 is a detailed configurative view illustrating an analog I/O module according to an exemplary embodiment of the present disclosure.

The disclosed embodiments and advantages thereof are best understood by referring to FIGS. 1-3 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, an analog I/O module according to the present disclosure will be described in detail with reference to the accompanying drawings.

FIG. 2 is a schematic configurative view illustrating a PLC system according to an exemplary embodiment of the present disclosure.

Referring to FIG. 2, the PLC system according to the present disclosure comprises a PLC (Programmable Logic Controller, 20) connected to a user terminal (10), and a plurality of HART (Highway Addressable Remote Transducer) transmitters (30).

The PLC (20) according to the present disclosure comprises a CPU (Central Processing Unit, 21), an analog input module (22) performing a HART interface function, a power unit (23) and other modules, the fact of which is well known. Although FIG. 2 has illustrated only four (4) HART transmitters (30) for convenience sake, it should be apparent to the skilled in the art that the number of the HART transmitters is not limited thereto.

An analog I/O module (22) according to the present disclosure can simultaneously perform the functions of the transmitter interface (300) and the communication module (220) of PLC in FIG. 1, it can be learned that configuration in FIG. 2 has been greatly simplified over that of FIG. 1.

FIG. 3 is a detailed configurative view illustrating an analog I/O module (22) according to an exemplary embodiment of the present disclosure.

Referring to FIG. 3, the analog I/O module (22) comprises analog signal processing unit (40) receiving a signal outputted from a HART transmitter (30), and signal-processing by separating analog signal from HART data, and digital signal processing unit (50) controlling the analog signal processing unit (40) and storing a conversion result.

To be more specific, the analog signal processing unit (40) comprises an I/O unit (41), a switching unit (42), an ADC (Analog/Digital Converter, 43), a HART communication unit (44), and an insulation unit (45). Furthermore, the digital signal processing unit (50) comprises an interface unit (51) and a controller (52).

The I/O unit (41) multiplexes the signal outputted from the HART transmitter (30). The I/O unit (41) may form channels with the plurality of HART transmitters (30), and include a plurality of terminals receiving a signal from a channel corresponding to the plurality of HART transmitters (30).

The switching unit (42) switches a HART output signal outputted from the HART communication unit (44) to a predetermine terminal of the I/O unit (41) in response to control of the controller (52). That is, the switching unit (42) selects a channel configured to transmit the HART data, and selects a terminal of the I/O unit (41) to allow the HART data to be outputted.

The ADC (43) converts analog signal received from the I/O unit (41) to digital data. The HART communication unit (44) converts the HART data received from the I/O unit (41) to digital data, and allows a HART output signal transmitted through the interface unit (51) and the controller (52) from a PLC CPU (21) to be outputted to the HART transmitter (30) by the I/O unit (41) through the switching unit (42).

The insulation unit (45) comprises a plurality of photo couplers to separate analog signal from a digital signal for enhancement of circuit reliability. The interface unit (51) of the digital signal processing unit (50) interfaces the insulation unit (45) and the PLC CPU (21). Furthermore, the interface unit (51) receives a preset parameter from outside device and stores a conversion result of the analog signal. The interface unit (51) may include a memory interface, for example. The controller (52) interprets and controls a signal transmitted from the HART communication unit (44).

Now, operation of the I/O module according to the present disclosure will be described.

The analog signal superimposed with the HART data received from the I/O unit (41) of FIG. 3 is separated from the HART data, and the analog signal received from the plurality of terminals is multiplexed by the I/O unit (41). The analog signal multiplexed by the I/O unit (41) is inputted to the ADC (43) and converted to digital data, and the HART data superimposed on the analog signal through the I/O unit (41) is separated from the analog signal to be inputted to the HART communication unit (44). To this end, the analog signal processing unit (40) according to the present disclosure may further comprise a filtering unit (not shown) separating the analog signal from the HART data.

The digital data converted by the ADC (43) is stored in the interface unit (51) through the insulation unit (45). The HART communication unit (44) may include a HART modem, for example. The HART communication unit (44) outputs HART data inputted from outside device through a predetermined pin (ORSC and OCD pin of FIG. 1). The HART data thus outputted is transmitted to the controller (52) through the insulation unit (45).

In a case a user is desirous of transmitting a HART command to the HART transmitter (30), the HART command received from the PLC CPU (21) is transmitted to the controller (52) through the interface unit (51), and transmitted to INTRS and ITXD terminals of the HART communication unit (44) through the insulation unit (45) via a predetermined terminal of the controller (52). The signal thus transmitted is transmitted to the I/O unit (41) through an output terminal of the HART communication unit (44), where the switching unit (42) may be interposed between the output terminal of the HART communication unit (44) and the I/O unit (41). The switching unit (42) maintains an opened state in a case the HART data is not transmitted. The multiplexing of the I/O unit (41) and the switching operation of the switching unit (42) may be controlled by the controller (52).

Additional installation of a HART interface module to the existing facilities for HART communication needs lots of costs, and in such a case, problems related to the cost and installation may be solved by adding a HART communication function to an analog I/O module capable of using existing wirings according to the present disclosure.

The plurality of HART transmitters (30) connected to the PLC (20) according to the present disclosure can easily learn defects of product, troubleshooting process and on-site status through the HART communication to thereby reduce maintenance/repair costs. The present disclosure is advantageous in that the existing analog wirings are used as communication channels, and wiring cost for build-up of field bus can be saved.

That is, addition of HART communication function to the I/O module and an advantage of field bus is utilized by the I/O module of PLC to reduce the wiring cost of field bus including labor cost, wiring and terminal installation, whereby requirement at the field site desired to use field bus data at a reasonable cost can be satisfied.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. An analog input/output (I/O) module comprising:
   a first signal processing unit and a second signal processing unit, the first signal processing unit comprising:
   an I/O unit comprising a plurality of terminals each corresponding to one of a plurality of Highway Addressable Remote Transducer (HART) transmitters, the I/O unit configured to separate a signal received from one of the plurality of HART transmitters into an analog signal and first HART data;
   a conversion unit configured to convert the analog signal to digital data;
   a communication unit configured to transmit the first HART data to the second signal processing unit, and to transmit second HART data received from the second signal processing unit to the I/O unit;

an insulation unit configured to insulate data output from the conversion unit and the communication unit; and a switching unit configured to switch the second HART data transmitted by the communication unit to a selected one of the plurality of terminals of the I/O unit to be transmitted to a corresponding one of the plurality of HART transmitters, wherein the switching unit is in an open state when the second HART data is not transmitted, wherein the second signal processing unit is configured to control the first signal processing unit and to store the digital data, wherein the second signal processing unit comprises:

an interface unit comprising an interface to a memory, the interface unit configured to cause the memory to store the digital data and to transmit the digital data to a high-level programmable logic controller (PLC) system; and a controller configured to interpret the first HART data received from the communication unit, provide the second HART data to the communication unit, and control the switching unit by determining a terminal of the I/O unit for transmitting the second HART data, wherein the interface unit is further configured to provide an interface between the controller and the insulation unit, wherein the switching unit is further configured to cause a HART signal to be output from the communication unit via the determined terminal of the I/O unit in response to control of the controller, and wherein the analog I/O module including the first signal processing unit and the second signal processing unit is mounted on a single slot of the high-level PLC system.

2. The analog I/O module of claim 1, wherein the first signal processing unit further comprises a filter unit configured to separate the analog signal from the first HART data.

3. The analog I/O module of claim 1, wherein:

the I/O unit is further configured to form channels with the plurality of HART transmitters; and each of the plurality of terminals is configured to transmit and receive signals to and from the plurality of HART transmitters via the channels.

4. The analog I/O module of claim 1, wherein the I/O unit is further configured to multiplex the analog signal and provide the multiplexed analog signal to the conversion unit.

* * * * *